US012733043B2

(12) United States Patent
Lataste et al.

(10) Patent No.: US 12,733,043 B2
(45) Date of Patent: Sep. 8, 2026

(54) METHOD FOR MANAGING A REQUEST TO ACTIVATE A PACKET DATA SESSION FOR A TERMINAL

(71) Applicant: ORANGE, Issy-les-Moulineaux (FR)

(72) Inventors: Sandrine Lataste, Châtillon Cedex (FR); Steve Tsang Kwong U, Châtillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 415 days.

(21) Appl. No.: 18/260,696

(22) PCT Filed: Dec. 29, 2021

(86) PCT No.: PCT/FR2021/052463

§ 371 (c)(1),
(2) Date: Jul. 7, 2023

(87) PCT Pub. No.: WO2022/148919

PCT Pub. Date: Jul. 14, 2022

(65) Prior Publication Data

US 2024/0064827 A1 Feb. 22, 2024

(30) Foreign Application Priority Data

Jan. 8, 2021 (FR) ........................................ 2100174

(51) Int. Cl.
*H04W 76/10* (2018.01)
*H04W 12/106* (2021.01)

(52) U.S. Cl.
CPC ......... *H04W 76/10* (2018.02); *H04W 12/106* (2021.01)

(58) Field of Classification Search
CPC ............................ H04W 76/10; H04W 12/106
(Continued)

(56) References Cited

U.S. PATENT DOCUMENTS

2020/0267554 A1* 8/2020 Faccin .................. H04W 12/06
2022/0174487 A1* 6/2022 Thakolsri ................ H04W 8/20
2022/0272620 A1* 8/2022 Ninglekhu ............ H04W 40/02

OTHER PUBLICATIONS

3rd Generation Partnership Project; Technical Specification Group Services and System Aspects; Procedures for the 5G System (5GS); Stage 2 (Release 15), 3GPP TS 23.502, V15.12.0, Dec. 2020 (Year: 2020).*

(Continued)

*Primary Examiner* — Nicholas R Taylor
*Assistant Examiner* — Chong G Kim
(74) *Attorney, Agent, or Firm* — David D. Brush; Westman, Champlin & Koehler, P.A.

(57) ABSTRACT

A method for managing a request to activate a packet data session for a user terminal capable of transmitting and receiving data over a communications network organized into network slices. The user terminal includes a subscription identifier for at least one of the slices of the network. The method is implemented by at least one network device and includes: receiving a request to activate a packet data session from the user terminal for a network slice, the activation request including an identifier of the requested slice, which is obtained from a parameter comprising one or more user-subscribed slice identifiers; obtaining, from the subscription identifier, an item of information for determining an authorization for the requested slice; verifying the authorization for the requested slice taking into account the item of information and, if the verification is negative, rejecting the request to activate a packet data session for the requested slice.

9 Claims, 8 Drawing Sheets

(58) Field of Classification Search
USPC .......................................................... 370/328
See application file for complete search history.

(56) References Cited

OTHER PUBLICATIONS

International Search Report dated Mar. 31, 2022 for corresponding International Application No. PCT/FR2021/052463, filed Dec. 29, 2021.
Written Opinion of the International Searching Authority dated Mar. 31, 2022 for corresponding International Application No. PCT/FR2021/052463, filed Dec. 29, 2021.
"3rd Generation Partnership Project; Technical Specification Group Services and System Aspects; Procedures for the 5G System (5GS); Stage 2 (Release 15)", vol. SA WG2, No. V15.12.0, Dec. 17, 2020 (Dec. 17, 2020), p. 1-365, 3GPP Standard; 3GPP TS 23.502, 3rd Generation Partnership Project (3GPP), Mobile Competence Centre ; 650, Route Des Lucioles ; F-06921 Sophia-Antipolis Cedex ; France Retrieved from the Internet: URL:https://ftp.3gpp.org/Specs/latest/Rel-15/23_series/23502-fc0.zip 23502-fc0.docx.
"3rd Generation Partnership Project; Technical Specification Group Services and System Aspects; System architecture for the 5G System (5GS); Stage 2 (Release 16)", Mar. 20, 2020 (Mar. 20, 2020), 3GPP Draft; 23501 G40_WAITING_23501_CR2179_CRS_IMPLEMENTED_CR2195FIX_R2, 3rd Generation Partnership Project (3GPP), Mobile Competence Centre ; 650, Route Des Lucioles ; F-06921 Sophia Antipolis Cedex, Retrieved from the Internet: URL:https://ftp.3gpp.org/tsg_sa/WG2_Arch/Latest_SA2_Specs.
"Digital cellular telecommunications system (Phase 2+) (GSM); Universal Mobile Telecommunications System (UMTS); LTE; 5G; Non-Access-Stratum (NAS) functions related to Mobile Station (MS) in idle mode (3GPP TS 23.122 version 16.7.0 Release 16)," ETSI, (Oct. 2020).
"5G; System architecture for the 5G System (5GS) (3GPP TS 23.501 version 16.6.0 Release 16)," ETSI, (Oct. 2020).
"5G; Procedures for the 5G System (5GS) (3GPP TS 23.502 version 16.7.0 Release 16)," ETSI, (Jan. 2021).
"5G; 5G System; Session Management Services; Stage 3 (3GPP TS 29.502 version 16.5.0 Release 16)," ETSI, (Nov. 2020).
"5G; 5G System; Unified Data Management Services; Stage 3 (3GPP TS 29.503 version 16.4.0 Release 16)," ETSI, (Jul. 2020).
"5G; Security architecture and procedures for 5G System (3GPP TS 33.501 version 16.3.0 Release 16)," ETSI, (Aug. 2020).
"LTE; Evolved Universal Terrestrial Radio Access (E-UTRA); User Equipment (UE) procedures in idle mode (3GPP TS 36.304 version 16.2.0 Release 16)," ETSI, (Nov. 2020).
"5G; NR; User Equipment (UE) procedures in idle mode and in RRC Inactive state (3GPP TS 38.304 version 16.1.0 Release 16)," ETSI, (Jul. 2020).
"5G; NG-RAN; NG Application Protocol (NGAP) (3GPP TS 38.413 version 16.2.0 Release 16)," ETSI, (Jul. 2020).
"5G; Policy and charging control framework for the 5G System (5GS); Stage 2 (3GPP TS 23.503 version 16.5.0 Release 16)," ETSI, (Jul. 2020).
"5G; Non-Access-Stratum (NAS) protocol for 5G System (5GS); Stage 3 (3GPP TS 24.501 version 16.5.1 Release 16)," ETSI, (Aug. 2020).
"5G; Application of the NG Application Protocol (NGAP) to non-3GPP access (3GPP TS 29.413 version 15.3.0 Release 15)," ETSI, (Oct. 2019).
"5G; 5G System; Technical Realization of Service Based Architecture; Stage 3 (3GPP TS 29.500 version 16.4.0 Release 16)," ETSI, (Nov. 2020).
English translation of the Written Opinion of the International Searching Authority dated Mar. 31, 2022 for corresponding International Application No. PCT/FR2021/052463, filed Dec. 29, 2021.
"3rd Generation Partnership Project; Technical Specification Group Services and System Aspects; Procedures for the 5G System (5GS); Stage 2 (Release 15)", vol. SA WG2, No. V15.12.0, Dec. 17, 2020, pp. 1-365, 3GPP Standard; 3GPP TS 23.502, 3rd Generation Partnership Project, Mobile Competence Centre ; 650, Route Des Lucioles ; F-06921 Sophia Antipolis Cedex, France.
"3rd Generation Partnership Project; Technical Specification Group Services and System Aspects; System architecture for the 5G System (5GS); Stage 2 (Release 16)", Mar. 20, 2020 (Mar. 20, 2020), 3GPP Draft; 23501 G40_Waiting_23501_CR2179_CRS_Implemented_CR2195FIX_R2, 3rd Generation Partnership Project, Mobile Competence Centre ; 650, Route Des Lucioles; F-06921 Sophia Antipolis Cedex, France.

* cited by examiner

[Fig. 1]
UE1
DN1
SI1
DN2
SI2
DN3
SI3
UE2
AN
[Fig. 2]
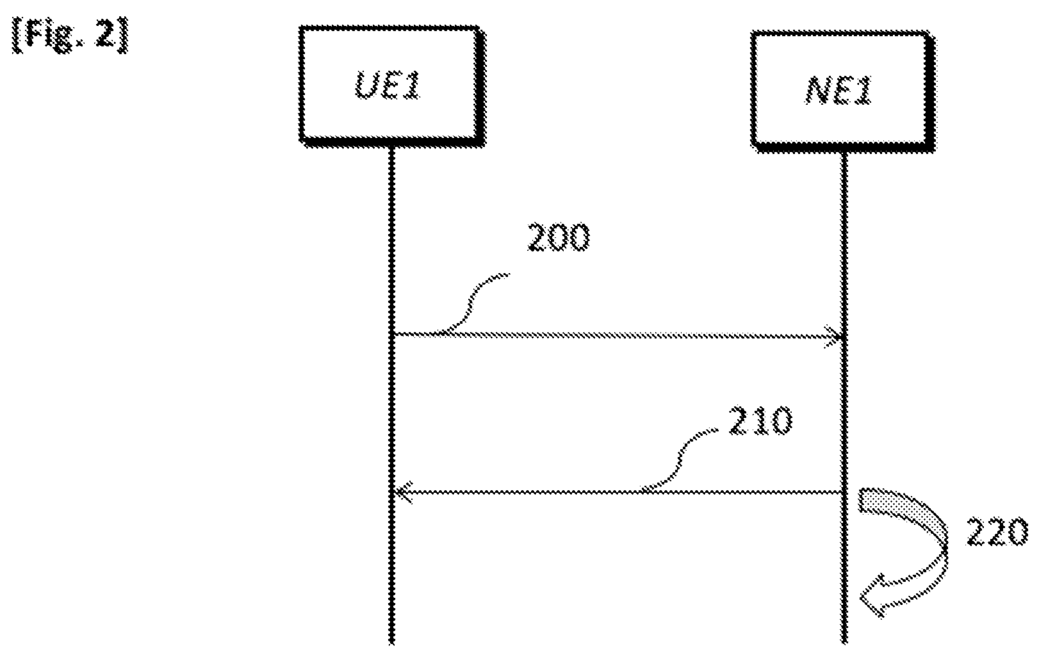

[Fig. 3a]
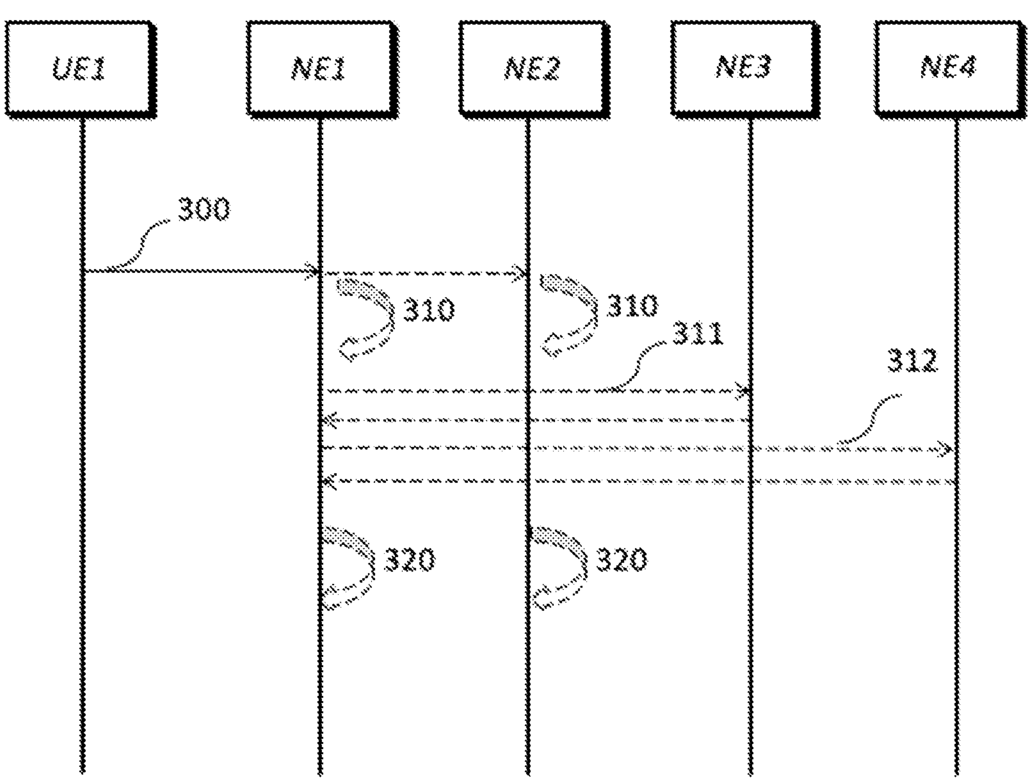

[Fig. 3b]
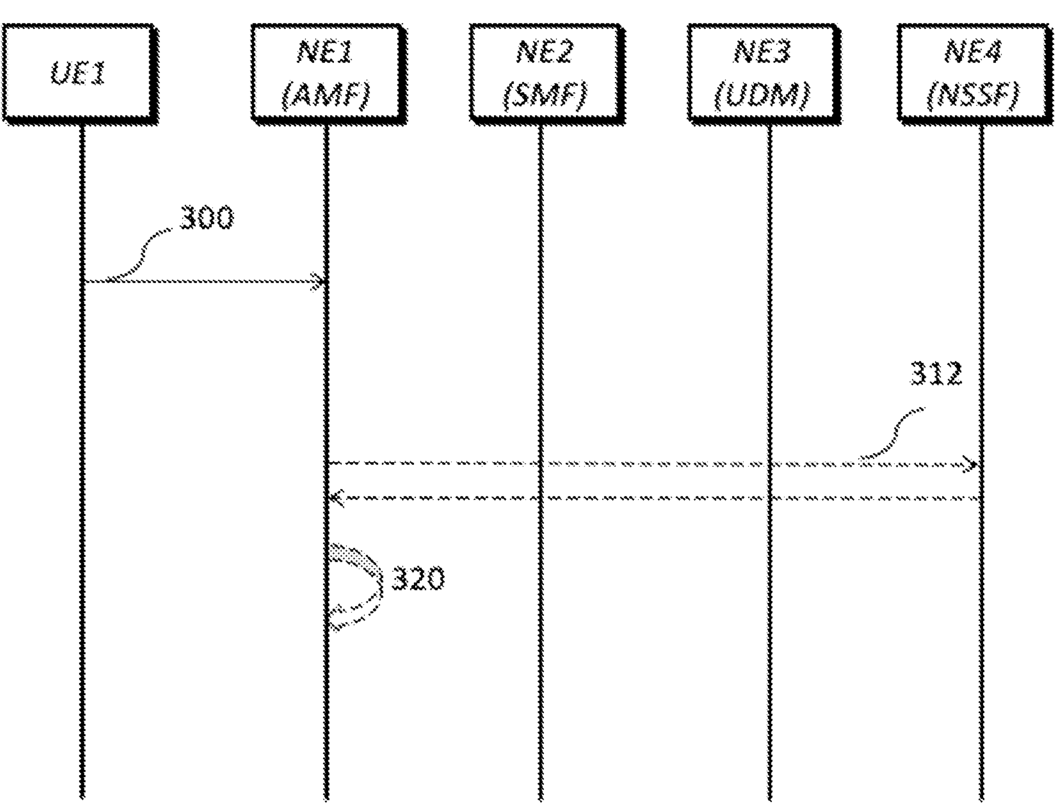

[Fig. 3c]
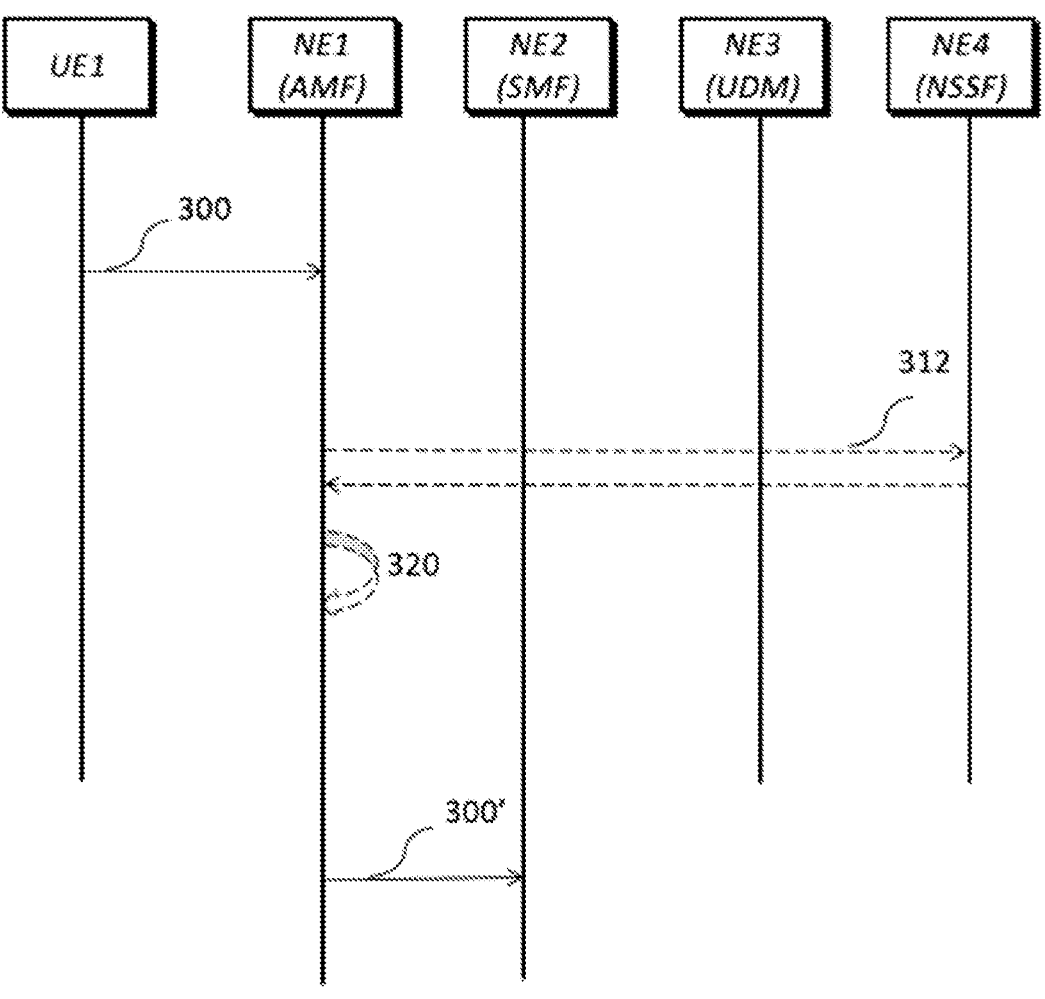

[Fig. 3d]
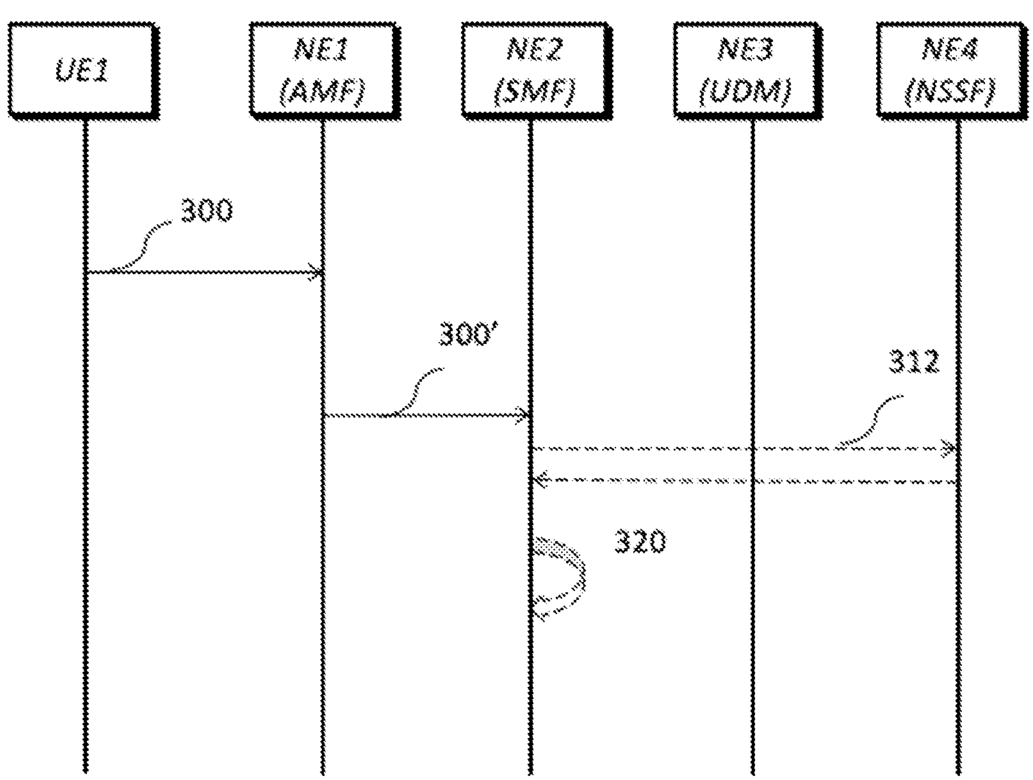

[Fig. 3e]
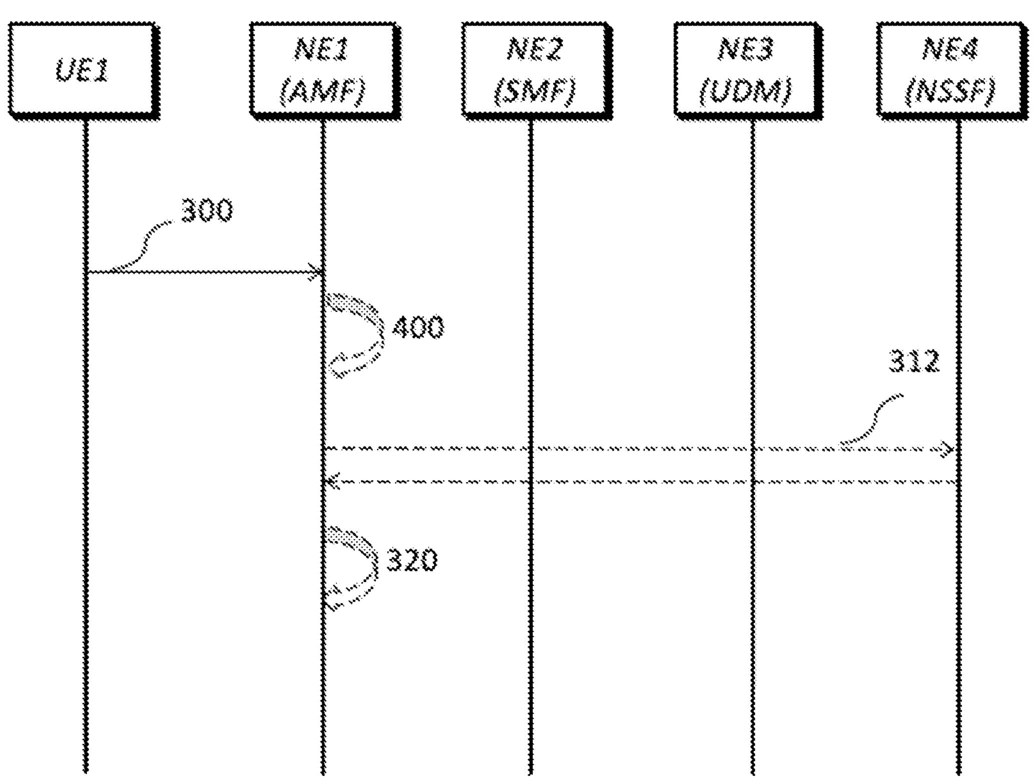

[Fig. 3f]
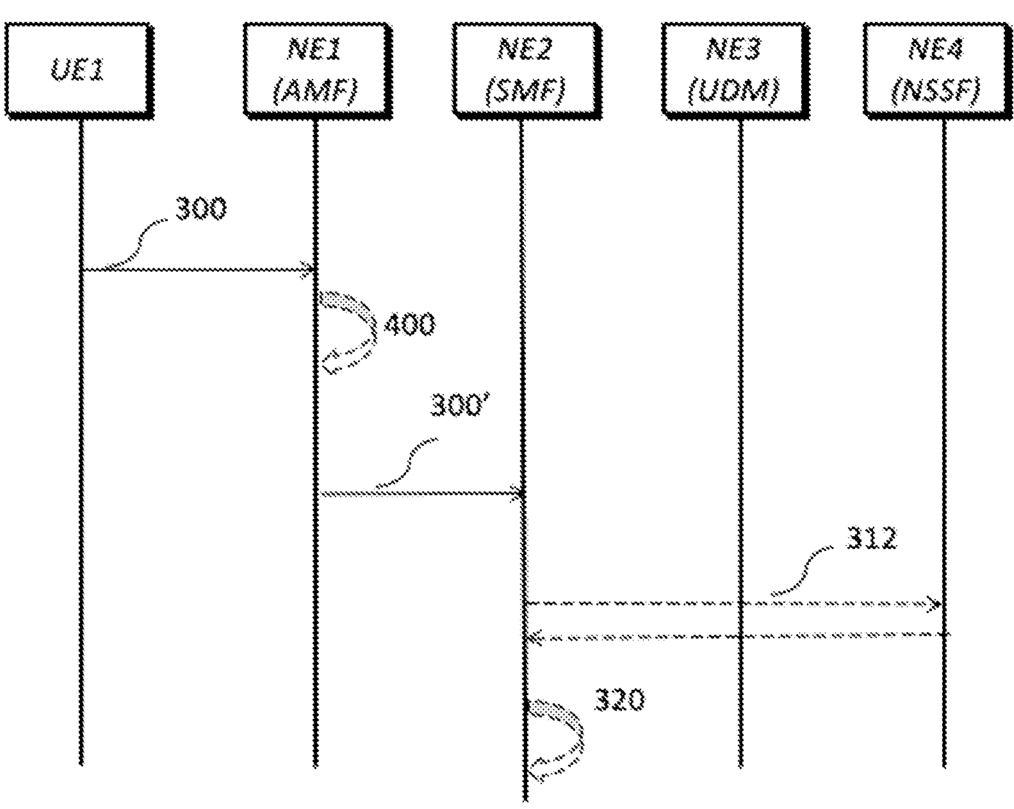

[Fig. 3g]
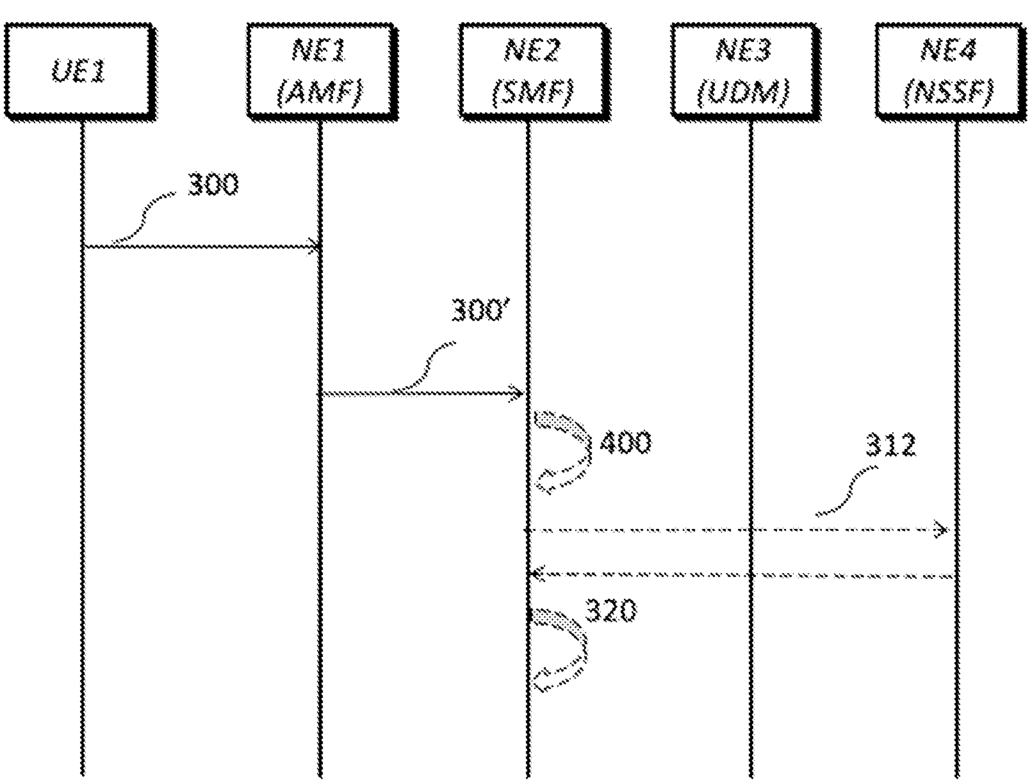

METHOD FOR MANAGING A REQUEST TO ACTIVATE A PACKET DATA SESSION FOR A TERMINAL

CROSS-REFERENCE TO RELATED APPLICATIONS

This Application is a Section 371 National Stage Application of International Application No. PCT/FR2021/052463, filed Dec. 29, 2021, which is incorporated by reference in its entirety and published as WO 2022/148919 A1 on Jul. 14, 2022, not in English.

TECHNICAL FIELD

The invention is located in communications networks, and in particular in networks in which network slices are instantiated, allowing dedicating devices/functions/configurations communications network for specific services and/or specific clients and/or specific terminals. More particularly, the invention aims to manage requests, from a user terminal, to activate a packet data session for a slice of such a network.

PRIOR ART

Some network architectures specified and deployed nowadays are structured into network slices enabling a user terminal, depending on the subscription of the user, to benefit from specific functions (routing, processing, administration . . . ) adapted to one or more criteria among the terminal type, the application type, the access type, etc. . . . . Thus, each slice allows offering a service quality and security level in accordance with one or more criteria mentioned hereinabove. It should also be noted that the clients and the terminals are on the one hand increasingly diversified (IoT (Internet of Things) terminals, smartphones, robots, various so-called communicating devices . . . ) and on other hand having quite different capacities and needs. This evolution is further accompanied with a capacity of at least some of these terminals to be able to access, simultaneously or not, a plurality of applications whose data are possibly routed on distinct network slices. It should be noted that these evolutions concern both stationary networks and mobile networks and that the specifications of so-called fifth generation (5G) networks incorporate this structuring into network slices.

According to the specifications of the 5G networks to which particular reference will be made in the rest of this description, a user terminal locally stores the identifiers of S-NSSAI slices (Single-Network Slice Selection Assistance Information) to which the user has subscribed (the subscribed S-NSSAI being referenced in a piece of data denoted Configured NSSAI). The user terminal also stores the identifiers of slices for which the terminal is authorized to activate one or more packet data session(s), by the network and in particular via an entity denoted AMF (Access and Mobility Function), in a piece of data denoted Allowed NSSAI, containing all or part of the subscribed S-NSSAI). The user terminal also stores the identifiers of slices that are prohibited thereto (by the network) in a piece of data denoted Rejected NSSAI. These identifiers of authorized/rejected slices are received by the terminal in the acceptance reply from the network during the procedure of registration thereof with the network.

Similarly, a device of the network stores a context piece of information associated to the user terminal (UE Context), during the registration procedure, this context information containing in particular the identifiers of authorized slices (Allowed NSSAI) as well as a registration state of the user terminal (RM State).

One could note that there is no consistency between the information stored at the terminal level and those stored at the network level, the identifiers of rejected slices (Rejected NSSAI) not being stored for example at the network level, and the context information of the user terminal (UE Context) not being stored at the user terminal level.

Moreover, during a subsequent registration, the user terminal first analyzes the identifiers of rejected slices (Rejected NSSAI) in order not to request again the registration of a slice rejected during the previous registration, for the same access type and the same registration area. Afterwards, at the time of activation of a packet data session (PDU session for 5G, with PDU standing for Protocol Data Unit), the user terminal analyzes the identifiers of authorized slices (Allowed NSSAI) in order to activate PDU sessions only for authorized slices. Thus, according to the current specifications, the user terminal cannot activate a packet data session on a slice not present among the previously authorized slices.

In addition, upon activation of a packet data session, the network, via an entity denoted SMF (Session Management Function), controls the validity of the request to activate a packet data session with regards to its local policy and the subscription rights associated to the user. However, the entity SMF does not control whether the requested slice is authorized or not for the access type and the current registration area, because this control is implemented at the time of registration by the aforementioned network entity AMF.

Thus, the use of the slice information is not consistent either, some stored information never being used at the time of activation of the packet data session, like for example the identifiers of authorized or rejected slices stored at the network level.

The specifications rely on a correct processing at the terminal level (to select which slices to request in the registration request or an authorized slice to request in the request to activate a packet data session) and do not process for example the case of a wrongly configured or wrongly used user terminal which would request the activation of a packet data session for a slice that has not been authorized during the registration procedure.

Moreover, according to the prior art, it is possible that the use of a slice is actually authorized for the user terminal but that the network is not aware of that when it receives the request to activate a packet data session because the registration has not been done beforehand for this slice (the authorized/rejected slices are determined by the network during the registration procedure, among the slices requested by the user terminal in its registration request). Hence, the main drawbacks of the current specifications and techniques lies in that not all of the information relating to the network slices, stored by the network and/or the user device, are taken into account by the network, generating both a useless storage, an insufficient control of use of the slices and a limitation in the uses by not using information that is nevertheless accessible.

Hence, there is a need for a technique allowing for a better management of the network slice information both at the user device level and at the network level, while enabling applicability in 5G as well as any future generation of networks using an architecture structured into network slices.

DISCLOSURE OF THE INVENTION

The invention addresses this need by providing a method for managing a request to activate a packet data session for a user terminal capable of transmitting and receiving data over a communications network organized into network slices, the user terminal comprising a subscription identifier for at least one of the slices of the network, the method being implemented by at least one network device, and comprising:

- receiving a request to activate a packet data session from the user terminal for a slice of the network, the activation request comprising an identifier of the requested slice, obtained from a parameter comprising one or more identifier(s) of user-subscribed slice(s);
- obtaining, from the subscription identifier, at least one piece of information allowing determining an authorization for the requested tranche;
- verifying the authorization for the requested slice taking into account the at least one piece of information allowing determining an authorization for the obtained requested slice and, if the verification is negative, rejecting the request to activate a packet data session for the requested slice.

Thus, the present technique is based on a completely novel and inventive approach of the procedure of activation of a packet data session for a user terminal for a slice of a communication network, consisting in performing the authorization verification for a requested slice, and where appropriate, the authentication of the requested slice, upon reception of the request to activate a packet data session, and in some embodiments dispenses with the authorization test provided for at the time of the prior procedure of registration of the network in the techniques of the prior art. In addition, the authorization verification is performed for one single slice, for which the user terminal has transmitted a request to activate a packet data session, and no longer for one or more slice(s) as is the case upon registration of a user terminal according to the prior art. In particular, this approach allows providing a simplified procedure for registering a user terminal during which no slice authorization verification is implemented, neither by the user device nor by the network, thereby dispensing, in a first embodiment, with the storage of some information relating to the slices to which the user device wishes to be able to access. In addition, the fact of not managing, at the network level in particular, this slice authorization information associated to a user device enables the network, and in particular the access control device, for example the entity AMF according to the current standard (Access and Mobility Management Function), to receive and process more requests from more user devices.

Indeed, according to the current specifications and the prior art, a user device cannot request an activation of a packet data session without having verified beforehand that the desired slice has actually been authorized during a prior registration procedure. To do so, it should therefore store this slice authorization/rejection information. Similarly, on the network side, a verification should be performed concerning the authorization of each slice to which a user device would potentially wish to access, depending on the location of the user terminal at the time of its registration request. Therefore, the network should also inform the user device of any change of state for a slice according to the current location of the user device. All these steps and all these storages, which are not performed thanks to the proposed technique, allow for savings in energy and storage capacity, both at the user device level and at the network level, as well as time savings having a direct positive impact on the user experience.

Thus, the network entity searches, based on a subscription identifier associated to the user terminal, the subscription data to find at least the subscribed slices, or else, according to different embodiments, directly information relating to the authorization or rejection of the requested slice. Thus, thanks to the subscription identifier, stored for example in the SIM card of the user terminal, the network entity may obtain a piece of information enabling it to determine, afterwards, whether a slice is authorized or rejected.

Thus, the subscription identifier (for example the SUPI, standing for Subscription Permanent Identifier) stored in the user terminal (in its SIM card), allows accessing a subscription data management network device (for example the UDM entity according to the standard in force, Unified Data Management, storing these subscription data itself or able to obtain them from one or more other entities such as UDR, Unified Data Repository ensuring storage thereof) to obtain the subscribed slices and thus verify their authorization, according to a first embodiment, or enables, according to other embodiments, access to an context parameter (for example UE Context, standing for User Equipment Context) associated to the user terminal, referencing the slices authorized and/or rejected during the registration procedure or obtaining from the subscription data management network device the authorized and/or rejected slices.

The network entity implementing the steps of the method may correspond to an access control network entity (for example the entity AMF) or to a session control network entity, for example the SMF (Session Management Function) entity. Some steps may be implemented by either one of these entities, or may all be implemented by an entity of the AMF type or of the SMF type.

According to an aspect of the method for managing a request to activate a packet data session, the reception of the activation request is implemented by an access control network device and the other steps are implemented by an access control network device or a session control network device.

According to an aspect of the method for managing a request to activate a packet data session, the verification of the authorization for the requested slice also takes account of at least one piece of data relating to a current location of the user terminal and/or an access type used by the user terminal.

Thus, the network entity also takes into account, in addition to subscription data, data relating to the location of the user terminal (for example when it consists of a mobile terminal) and/or the access type used by the user terminal.

According to one aspect, the method for managing a request to activate a packet data session comprises, if the slice authorization verification is positive and if a subscription piece of data comprises an indicator requiring the authentication of the authorized slice, an authentication of the authorized slice, and:

- if the authentication is positive, carrying on the procedure for managing the request to activate a packet data session for the authorized slice;
- if the authentication is negative, rejecting the request to activate a packet data session for the authorized slice.

Thus, according to this first embodiment, if the subscription data relating to the authorized slice require an authentication of this slice, the method implements this authentication, before carrying on the packet data session activation procedure. In particular, this allows avoiding implementing the step of selecting a session control network device or SMF (Session Management Function) if the slice is not authenticated. If the authentication fails, the request to activate a packet data session for the requested slice is rejected, otherwise, the packet data session activation procedure continues.

According to one aspect, the method for managing a request to activate a packet data session comprises, before verifying the authorization for the slice and if a subscription piece of data comprises an indicator requiring the authentication of the slice, authenticating the requested slice, and if the authentication is negative, rejecting the request to activate a packet data session for the requested slice.

Thus, according to this second embodiment, if the subscription data, relating to the slice for which the user terminal requests packet data session activation, requires an authentication of this slice, this authentication is implemented before the verification of the authorization of the slice. This allows directly rejecting the slice activation request if the authentication fails, or continuing with the verification of the authorization of the slice when the latter is authenticated.

According to an aspect of the method for managing a request to activate a packet data session, the obtainment comprises transmitting a query request intended for a subscription data management network device, the request comprising the subscription identifier, and receiving a reply from the subscription data management network device comprising the at least one piece of information allowing determining an authorization for the requested slice.

Thus, the information necessary for the verification of the authorization, and, where appropriate, the authentication, of the slice for which the user terminal requests the activation of a packet data session, are obtained by interrogating a subscription data management network device, for example called UDM according to the standard in force (Unified Data Management). This interrogation is implemented if the access control device of the network (for example the AMF) does not have these subscription data at its disposal, in particular if it has not stored them locally during the registration procedure. In particular, this interrogation of the subscription data management network device comprises a subscription identifier (for example the SUPI identifier, Subscription Permanent Identifier), stored by the user terminal, so as to be able to find the subscription information relating to the user for the requested slice. In some variants, the network entity interrogates the subscription data management network device to directly find the authorized slices/rejected slices.

According to an aspect of the method for managing the request to activate a packet data session, verifying the authorization for the slice comprises transmitting a query request intended for a slice instance selection network device, the request comprising at least the identifier of the requested slice and a subscription piece of data comprising the identifiers of the subscribed slices, and receiving a reply from the slice instance selection network device comprising a piece of information representative of an authorization or a rejection for the requested slice. Thus, if the network device (for example AMF or SMF) does not have access to the data enabling it to authorize or reject the requested slice, a request is transmitted to another network entity, for example the NSSF (Network Slice Selection Function) entity, in particular by providing it with the subscription data obtained beforehand (with the identifiers of the subscribed slices) and the identifier of the requested slice (it should be noted that the information on the current location is also useful for authorization on a 3GPP access). In particular, this variant allows implementing the verification of the authorization even when the AMF or the SMF does not directly have the data to do so.

For example, the reply from the slice instance selection network device may contain the requested slice in a parameter such as the variable Allowed NSSAI or the variable Rejected NSSAI depending on whether the slice is authorized or rejected (in the case where it is rejected this could be for the entire public land mobile network (PLMN, Public Land Mobile Network) or the current location of the user terminal).

According to an aspect of the method for managing the request to activate a packet data session, the authorization for the slice is followed by selecting a session control network device and controlling, by the selected session control network device, the validity of the request to activate a packet data session for the user terminal and the authorized slice, taking into account the at least one subscription piece of data and a policy of the selected session control network device. Thus, according to this embodiment, the packet data session activation procedure continues, once the requested slice has been authorized and, where appropriate, authenticated, with the implementation of the conventional step of selecting a device in charge of session control, by a device in charge of access management. Hence, this step is implemented either following the verification of the authorization for the requested slice, or following the authentication of the authorized slice. Yet, conventionally according to the prior art, the slice authentication step is the last step of the registration procedure, therefore followed by no step, and the authorization verification step, also implemented during the registration procedure, is also not followed by a step of selecting the session control equipment, or SMF, this step being implemented during the packet data session activation procedure.

According to a first variant of the method for managing a request to activate a packet data session for a terminal, the verification of the authorization for the requested slice comprises a search for the identifier of the requested slice from a list of identifiers of previously authorized slices associated to the subscription piece of data and

- if the search is positive, carrying on the packet data session activation procedure,
- if the search is negative, negative verification result.

According to a second variant of the method for managing a request to activate a packet data session for a terminal, the verification of the authorization for the requested slice comprises a search for the identifier of the requested slice from a list of identifiers of previously authorized slices associated to the subscription piece of data and

- if the search is positive, carrying on the procedure for managing a request to activate a packet data session,
- if the search is negative, second authorization verification step such as that one described hereinabove.

According to a third variant of the method for managing a request to activate a packet data session for a terminal, the verification of the authorization for the requested slice comprises a search for the identifier of the requested slice from a list of identifiers of previously rejected slices associated to the subscription piece of data and

- if the search is positive, negative verification result,
- if the search is negative, second search for the identifier of the requested slice from a list of identifiers of previously authorized slices associated to the subscription piece of data, and if the second search is positive, carrying on the procedure for managing a request to activate a packet data session, if the second search is negative, negative verification result.

According to a fourth variant of the method for managing a request to activate a packet data session for a terminal, the verification of the authorization for the requested slice comprises a search for the identifier of the requested slice from a list of identifiers of previously rejected slices associated to the subscription piece of data and if the search is positive, negative verification result, if the search is negative, second search for the identifier of the requested slice from a list of identifiers of previously authorized slices associated to the subscription piece of data, and if the second search is positive, carrying on the procedure for managing a request to activate a packet data session, if the second search is negative, second authorization verification step such as that one described hereinabove.

According to a fifth variant of the method for managing a request to activate a packet data session for a terminal, the verification of the authorization for the requested slice comprises a search for the identifier of the requested slice from a list of identifiers of previously rejected slices associated to the subscription piece of data and if the search is positive, negative verification result, if the search is negative, second authorization verification step such as that one described hereinabove.

For all these variants, it does not matter whether the registration procedure is carried out according to the standard (where Allowed NSSAI is stored rather than Rejected NSSAI) or according to the invention (where the different cases of Allowed NSSAI and/or Rejected NSSAI storage are considered).

In addition, for all these variants, if the slice authorization result is positive, the slice authentication is not to be done, even though it is required by the subscription, because it has been done during the registration procedure.

The invention also relates to a computer program product comprising program code instructions for the implementation of a method as described before, when it is executed by a processor. The invention also relates to a computer-readable recording medium on which a computer program is recorded comprising program code instructions for the execution of the steps of the method according to the invention as described hereinabove.

Such a storage medium may be any entity or device capable of storing the program. For example, the medium may include a storage means, such as a ROM, for example a CD-ROM or a ROM of a microelectronics circuit, or a magnetic storage means, for example a flash disk or a hard disk. Besides, such a storage medium may be a transmissible medium such as an electrical or optical signal, which could be conveyed via an electrical or optical cable, by radio waves or by other means, so that the computer program contained therein is remotely executable. In particular, the program according to the invention may be downloaded on a network for example the Internet network.

Alternatively, the recording medium may be an integrated circuit in which the program is incorporated, the circuit being adapted to execute or to be used in the execution of the aforementioned display control method.

The invention also relates to a device for managing a request to activate a packet data session for a user terminal capable of transmitting and receiving data over a communications network organized into network slices, the user terminal comprising a subscription identifier for at least one of the slices of the network, the device being implemented by at least one network device, and comprising a receiver, a transmitter, a processor and a memory coupled to the processor with instructions intended to be executed by the processor to:

receive a request to activate a packet data session from the user terminal for a slice of the network, the activation request comprising an identifier of the requested slice, obtained from a parameter comprising one or more identifier(s) of user-subscribed slice(s);

obtain, from the subscription identifier, at least one piece of information allowing determining an authorization for the requested tranche;

verify the authorization for the requested slice taking into account the at least one piece of information allowing determining an authorization for the obtained requested slice and, if the verification is negative, reject the request to activate a packet data session for the requested slice. This device, capable of implementing in all of its embodiments the method for managing a request to activate a packet data session that has just been described, is intended to be implemented in a network entity.

This device and the aforementioned corresponding computer program have at least the same advantages as those conferred by the method for managing a request to activate a packet data session according to the present technique.

The network entities described in the present application may correspond to virtual entities, also called functions.

The identifiers of S-NSSAI slices are stored for example in the form of variables containing one or more field(s), as well as the specific data Configured NSSAI, Allowed NSSAI or Rejected NSSAI. The invention also relates to a method for registering a user terminal with a communications network organized into network slices, said user terminal being capable of transmitting and receiving data over the network, the method being implemented by an access control network device capable of communicating with the user terminal via the network and comprising receiving a registration request transmitted by the user terminal to register with at least one of the slices of the network, the registration request comprising an identifier S-NSSAI of the at least one slice, obtained from a parameter Configured NSSAI associated to the user terminal and comprising one or more identifier(s) of user-subscribed slice(s) without prior verification by the user terminal that the slice has been previously rejected by the network;

transmitting, to the user terminal, an information message in response to the registration request comprising acceptance information, with no information on the authorized and/or rejected slices, or information on the rejection of a registration request for the at least one slice;

generating for a context parameter of the user terminal binary recording state information associated to the user terminal with no information relating to the authorized slices or rejected slices.

Thus, the present technique is based on a completely new and inventive approach to the procedure of registration of a user terminal for one or more slice(s) of a communication network, in particular dispensing with the conventional steps of verifying the authorized or rejected status of the slices requested both for the user terminal and for the network device. In addition, this simplified procedure also dispenses with the storage of the information relating to the authorized or rejected slices, both at the user terminal level and at the network level. Thus, upon completion of a registration request for one or more slice(s) of the network transmitted by a user terminal, only the general registration context of the user terminal (accepted or rejected) is stored at the network level, with no storage of specific information relating to an authorized or rejected state of each of the requested slices.

To do so, the user terminal uses only information relating to the subscription of slices performed by the user, this information being available in the form of a configuration piece of data comprising the identifiers of the subscribed slices. Similarly, the network device in charge of accepting or rejecting the registration request from the user terminal does not store specific information relating to the authorized/rejected status of the requested slices but stores only a piece of information on the general context of the user terminal relating to its accepted or rejected registration state. Thus, no information on authorized slices/rejected slices is transmitted to the user terminal, unlike current specifications.

Hence, the registration procedure is considerably simplified because it does not implement all of the steps provided for in the current specifications and considerably limits the amount of information stored during or upon completion of the registration procedure. Moreover, the simplification of the registration procedure also enables a simplification of the subsequent procedure of packet data session activation by the user terminal.

According to a particular aspect, the transmission comprises a prior verification of whether the at least one network slice or at least one of the requested slices is authorized, based on data relating to a current location of the user terminal and an access type requested by the user terminal and where the information message includes acceptance information if the result of the verification is positive or rejection information if the result of the verification is negative.

Thus, according to this variant, the network device in charge of processing the registration request performs a verification so as to reject the registration request if all requested slices are rejected, for example because of a location or an access type prohibited for the user terminal. This allows informing the user terminal that it should, for example, renew its registration request when it would have changed location, for example, before starting a packet data session activation procedure which would be declined if none of the subscribed slices is authorized thereto at a given time.

According to a particular feature, the generation comprises generating a piece of information relating either to the authorized slices, or to the rejected slices.

According to another feature, the piece of information relating to the authorized slices and/or rejected slices is stored in the subscription data management network device (where the latter is capable of retrieving this information as mentioned before; for simplicity for the rest of the description, it is assumed that the data are stored in the subscription data management network device, which does not exclude the case where the storage would be delegated to another entity). In particular, the storage of the piece of information relating to the authorized/rejected slices in the subscription data management network device allows covering the case where it is the SMF which will carry out the authorization and authentication control.

PRESENTATION OF THE FIGURES

Other aims, features and advantages of the invention will appear more clearly upon reading the following description, given as a simple illustrative and non-limiting example, with reference to the figures, wherein:

FIG. 1 shows an example of a simplified architecture of a communications network wherein the method for managing a request to activate a packet data session according to an embodiment of the invention is implemented;

FIG. 2 illustrates in the form of a block diagram the registration method according to an embodiment of the invention;

FIG. 3*a*, FIG. 3*b*, FIG. 3*c*, FIG. 3*d*, FIG. 3*e*, FIG. 3*f* and FIG. 3*g* illustrate in the form of a block diagram the method for managing the request to activate a packet data session according to several embodiments of the invention and several situations.

DETAILED DESCRIPTION OF EMBODIMENTS OF THE INVENTION

The present technique proposes a better management of slice information, both from a storage perspective and from a use perspective of this slice information, based on a trade-off between the amount of slice information to be stored and the usefulness of this information by the user terminal and the network, while optimizing the procedures for registering a user terminal and activating a packet data session for one or more slice(s) of the network for a user terminal. Thus, the knowledge at the user terminal level of the identifiers of the rejected slices (in the variable Rejected NSSAI) is of interest for the procedure of registration of the user terminal: indeed, this enables the user terminal not to request registration again for a slice that has been rejected during a previous registration. However, knowing the identifiers of the authorized slices (in the variable Allowed NSSAI) does not add anything to the registration procedure.

The knowledge at the user terminal level of the identifiers of the authorized and/or rejected slices is of interest for the PDU session activation procedure: indeed, knowing the identifiers of the authorized slices (in the variable Allowed NSSAI) enables the user terminal to activate a packet data session if the slice is authorized, and knowing the identifiers of the rejected slices (in the variable Rejected NSSAI) enable the user terminal not to request a packet data session if the slice is rejected.

However, it is possible that some slices and subscribed by the user and configured as such are neither among the authorized slices nor among the rejected slices, because the registration procedure as currently defined by the standard determines the authorized slices and the rejected slices only among the slices requested by the user terminal at the time of registration thereof. Hence, the knowledge, at the user terminal level, of the authorization and/or rejection information of the subscribed slices is neither accurate nor exhaustive.

Moreover, the knowledge at the network level, and in particular at the entity AMF level, via the information UE Context, of the following information, is of interest for the packet data session activation procedure:

- knowing the identifiers of the authorized slices (in the variable Allowed NSSAI) enables the network to accept a packet data session request from a user terminal if the slice has been authorized beforehand upon registration;

knowing the identifiers of the rejected slices (in the variable Rejected NSSAI) enables the network to reject a packet data session request if the slice has been rejected beforehand upon registration.

However, herein again, the network could be unaware of the authorization or rejection for some slices and therefore the network knows only the authorized slices among those that have been requested by the user terminal during the registration procedure.

Hence, the general principle of the proposed technique is based, according to one embodiment, on the fact of storing no slice information, both at the user terminal level and at the network level, during the procedure of registration of the user terminal. Only a piece of information representative of the registered or unregistered state of the terminal is stored at the network level.

Thus, this simplified procedure for registering the user terminal not only allows storing less information, both at the network level and at the user terminal level itself, and in particular not to store information regarding the authorization or rejection of the slices subscribed beforehand by the user, but also not to communicate this information from the network to the user terminal at the end of the registration procedure of the latter, and to do, on the user terminal side, without the control of the authorization or rejection of the slice for which it requests the activation of a packet data session. The user terminal may request the activation of a packet data session for any one of the slices to which the user has subscribed, without controlling beforehand whether these slices are authorized or rejected by the network.

Consequently, the proposed technique therefore also relies, according to different variants, on the control performed by the network during the packet data session activation procedure requested by the user terminal to know whether the slice requested by the terminal is authorized or not, and, where appropriate when required, whether it is authenticated or not.

Finally, according to a variant of the proposed technique, the network does not manage (nor communicate to the user terminal) any slice information relating to authorization or rejection, thereby facilitating operation thereof and that of the user terminal.

The proposed technique will now be described with reference to FIGS. 1 to 3*a*.

An example of a network architecture, in which the proposed technique could be implemented, is firstly illustrated, in a simplified manner, in FIG. 1. One or more user terminal(s), denoted UE1, UE2, access, via an access network AN, one or more data network(s) DN1, DN2 or DN3, via one or more slice(s) Sl1, Sl2 and Sl3.

Afterwards, a user terminal UE1 is considered which wishes to receive data on one or more slice(s) of a network as illustrated in FIG. 1.

To do so, a user U1, for example the main user of the user terminal UE1, subscribes, before his telecommunications operator, to one or more of the slices of the network, for example according to his habits or his content consumption wishes, the performances of his user terminal UE1 . . . .

Following his subscription, subscription data DSub, comprising in particular the identifiers of the slices to which the user U1 has subscribed, are created. In addition, a subscription identifier IdSub, for example the variable SUPI (or Subscription Permanent Identifier) allows accessing these subscription data DSub, for example when they are stored in a subscription data management network device. In particular, this subscription identifier is stored in the SIM card of the user terminal UE1 and is representative of the subscription, a subscription containing one or more subscribed slice(s), without being exclusively associated either to the user U1 or to the user terminal UE1. Indeed, another user U2 may have obtained the authorization from the user U1 to use his subscription, or the SIM card storing the subscription identifier may be transferred from the user terminal UE1 to another user terminal UE2 for example.

According to the proposed technique, and as illustrated in FIG. 2, the user terminal therefore requests afterwards registering with the network (for example via a network entity referenced NE1) for one or more user-subscribed slice(s). In particular, this information of the subscribed slices is available, since it is stored by the user terminal, in a data/parameter referencing the subscribed slices and denoted for example Configured NSSAI.

As already indicated before, according to this embodiment, the user terminal does not examine the state, authorized or rejected, of the slice or slices with which it requests to register, because it has not stored this authorization or rejection information during a previous registration. Indeed, this embodiment is based on a simplified registration procedure that does not store information relating to the authorized and/or rejected slices, in the user terminal, in contrast with the current standard.

In addition, as already indicated and described in more detail hereinbelow, the user terminal may request the activation of a packet data session for any subscribed slice (whose identifier is stored in the variable Configured NSSAI).

Thus, this registration procedure does not therefore implement, in particular, the step provided for by the current specifications during which the user terminal examines the value of the variable Rejected NSSAI so as not to request again the registration of a slice already rejected during the previous registration (for the same access type and the same registration area).

At the network level, the device NE1 or for example the access control network entity or function, AMF, receives, during a reception step 200, the registration request transmitted by the user terminal, with one or more identifier(s) of subscribed slices, and the registration procedure continues according to several variants.

According to a first variant of this registration method, the network entity NE1 does not verify whether the slices referenced by the identifiers in the request are authorized or rejected, for the current location of the user terminal and the requested access type, and accepts the registration request. The network entity NE1 informs the user terminal of this by transmitting 210 an acceptance message, with no information on the authorized or rejected slices.

According to a second variant of this registration method, the network entity NE1 verifies whether all of the slices requested in the registration request are not rejected, for the current location of the user terminal and the requested access type. If so is the case, the network entity NE1 rejects the registration request and informs the user terminal thereof by transmitting 210 a rejection message. The user terminal could subsequently reformulate its registration request, for example when it would have changed location. However, if at least one of the slices is authorized, the AMF accepts the registration request and informs the user terminal thereof by transmitting 210 an acceptance message, with no information on the authorized or rejected slices. According to this second variant, the verification of the authorized/rejected slices is implemented by the network entity NE1 taking into account the subscription data, from the subscription identifier.

According to these two variants of this registration method, the binary registration state of the user terminal (for example the parameter RM State) is updated, during a generation step 220, by the network entity NE1 and stored in a context parameter of the user terminal UE1 (for example the data/variable UE Context). By default, the registration state corresponds to the unregistered state, and if the registration request is accepted, the setting is updated with the registered state. Hence, this registration state enables the network to know whether the user terminal is actually registered with the network. However, this registration state is not communicated to the user terminal in the reply to its registration request because the terminal is capable of updating its registration state according to the standard (in particular switching to the registered state when it receives a registration acceptance reply).

Thus, upon completion of the procedure of registering the user terminal, the network entity NE1 transmits an information message comprising information on the acceptance or rejection (according to the second variant) of the registration comprising no information relating to the subscribed slices or the registration status of the user terminal.

Hence, this procedure considerably differs from the operation of the current standard, according to which all of the slices requested in the request are verified, the authorized slices are listed in a parameter (Allowed NSSAI) stored both on the network side and on the user terminal side, and the rejected slices are listed in a parameter (Rejected NSSAI) stored on the user terminal side. According to a third variant of this registration method, a verification of the authorization of the slices is performed for all of the slice identifiers of the registration request, and the results of this verification are stored respectively in a variable listing the identifiers of the authorized slices (for example the parameter Allowed NSSAI) and in a variable listing the identifiers of the rejected slices (for example the parameter Rejected NSSAI). In addition, these two variables are transmitted to the user terminal in the acceptance or rejection reply of the network. Thus, according to this third variant, the network is aware of the authorized and rejected slices, for example by storing in the context parameter of the user terminal UE1 (for example the data/variable UE Context) the variables Allowed NSSAI and Rejected NSSAI or by contacting a subscription data management network device capable of storing either one or both of these data. In particular, this information will be useful for the implementation of the procedure for managing a request to activate a packet data session from the user terminal to the network, described hereinafter.

According to the proposed technique, and thanks to the simplified registration procedure, the user terminal may request the activation of a packet data session for any one of the subscribed slices, i.e. for any one of the slices referenced for example in the variable Configured NSSAI, independently of the allowed/disallowed "status" that might be associated to that slice, in contrast with current specifications. In particular, the proposed technique enables the user terminal to be able to request the activation of a subscribed slice not yet requested by the user terminal but potentially authorized, while, according to the prior art, the user terminal can only do so for a slice already authorized therefore already requested, and above all cannot do so for a slice rejected during a previous registration.

According to the proposed technique, the user terminal UE1 requests the activation of a packet data session for a single slice and it is therefore the network, and in particular the entity NE1 corresponding for example to the entity or the function AMF, which proceeds with a verification of the authorization for the requested slice (and its authentication if the latter is required). This verification may take into account the type of access and the current location of the user terminal, since the subscription to some slices may be restricted to a given area or a given access type (3GPP, non-3GPP). The entity NE1, for example an access control network entity, may also transmit the request received from the user terminal to another network entity NE2, for example a session control network entity like the entity or the function SMF, which performs afterwards instead of NE1 either one or both of the slice authorization verification and slice authentication steps, if required, as explained hereinbelow (which requires a known prior SMF selection step of the standard).

Thus, FIG. 3*a* first illustrates a first step 300 of receiving, by a network entity NE1, a request to activate a packet data session from the user terminal UE1 for a slice i of the network identified by an identifier Sli. The network entity NE1 obtains, during a step 310 of obtaining, from the subscription identifier IdSub, at least one piece of information allowing determining an authorization for the requested slice (Sli).

This piece of information may correspond to subscription data (and in particular the identifiers of the subscribed slices) stored in a subscription data management network device accessible thanks to the subscription identifier. In this case, the subscription data are therefore obtained via an interrogation 311 of the subscription data management network device NE3, for example called UDM according to the standard in force (Unified Data Management). Afterwards, from these subscription data, the network entity NE1 (or NE2) may perform the step 320 of verifying the authorization for the requested slice by the user terminal UE1.

To do so, according to a first implementation, the network entity NE1 (or NE2) carries out this verification directly, from the retrieved subscription data, during a step 320.

According to a second implementation, the network entity NE1 (or NE2) does not have direct access to an authorization piece of information for the requested slice and performs an interrogation 312 of another slice instance selection network entity NE4, for example the entity NSSF by providing it in particular with a parameter with the identifiers of the subscribed slices (for example Subscribed NSSAI) and the identifier Sli (for example Requested NSSAI) corresponding to the requested slice.

The piece of information allowing determining an authorization for the requested slice (Sli) may also correspond, according to a third implementation, to data stored by the network entity NE1 in a context parameter of the user terminal (for example UE Context) comprising in particular the registration state (RM State) of the user terminal but also the identifiers of the authorized (Allowed NSSAI) and/or rejected (Rejected NSSAI) slices or, according to a fourth implementation, these same data stored in the subscription data (during registration) obtained by the network entity via an interrogation 311 of the subscription data management network device. Thus, from these identifiers of the authorized and/or rejected slices, the network entity NE1 (or NE2) may perform the step 320 of verifying the authorization of the slice requested by the user terminal UE1.

According to some implementations (the first and second ones), as indicated before, no information on authorized slices and on rejected slices is stored at the time of registration in contrast with other implementations where information on authorized slices and/or rejected slices could be stored in a context of the user terminal (third implementation) or in a subscription data management network device (fourth implementation).

Hence, it is important to note that the verification of the authorization concerns only the slice requested by the user terminal and this verification is implemented only during the packet data session activation procedure (and no longer during the user terminal registration procedure like in the current standard) for the first two implementations, or for the last two implementations, when the requested slice during the activation of a packet data session is not found in the list of previously stored authorized slices upon registration in a user context or a subscription data management network device.

The verification of the authorization for the requested slice may also take into account a piece of information on the location of the user terminal and/or a piece of information relating to the type of access used by the user terminal, since some slices could be subscribed with restrictions, in particular of areas or access type.

If the verification delivers a negative result, i.e. the requested slice is not authorized for the user terminal (maybe because of its location or the used access type), the network rejects the PDU session activation request (a specific error cause may be created for example rejected slice or unauthorized slice and possibly an additional parameter indicating the concerned slice) and the packet data session activation procedure is terminated for the requested slice.

However, if the verification delivers a positive result, then the packet data session activation procedure continues, according to different variants described hereinafter.

Thus, the network proceeds, afterwards, according to a first embodiment, with the authentication of the requested slice, if so required by the subscription (unless the slice is present in the list of authorized slices stored in a user context or a subscription data management network device; the authentication has been carried out during the registration for these cases). Indeed, the subscription data contain a piece of information indicating whether or not a slice has to be authenticated before being considered as authorized.

The authentication of the authorized slice is performed, for example according to a procedure similar to that one implemented during the registration procedure described in the standard, except that it is implemented only during the packet data session activation procedure. Thus, the sequence of the steps compared to the registration procedure described in the standard is different because the authentication of the slice is the last step of the registration procedure described in the standard (3GPP TS 23.502 v16.7.0 § 4.2.2.2.2 step 25) and is not followed by any other step.

If the authentication of the authorized slice is positive, then the packet data session activation procedure continues, according to different variants described hereinafter, and for example:

- with the step of selecting a session control network entity by the access control network entity (for example after having executed a slice authorization and/or a slice authentication or none of these steps), that being so in order to transmit to it the request originating from the user terminal; or
- with the step of interrogating the subscription data management network device by the session control network entity to obtain the subscription data relating to the session control if it does not already have them; or
- with the reply step from the session control network entity (for example after having executed a slice authorization and/or a slice authentication or none of these steps) to the access control network entity.

These steps are known from the standard (3GPP v16.7.0 TS 23.502 § 4.3.2.2.1 steps 2, 4, 5 respectively). However, if the session control entity interrogates the subscription data management network device to obtain the authorized slices/rejected slices information according to the invention, then this query is coupled in a single query with the query to obtain the session control data (if these data are not already present).

However, if the authentication of the authorized slice is rejected, then the network rejects the PDU session activation request and the packet data session activation procedure is terminated for the requested slice.

According to a second embodiment, the authentication of the slice may be carried out before the verification of the authorization for the requested slice, still if the subscription data so require. In this case, if the requested slice is not authenticated, the network rejects the PDU session activation request and the packet data session activation procedure is terminated for the requested slice. However, if the requested slice is authenticated, the verification of the authorization is implemented, as described hereinabove, and the packet data session activation procedure continues if the slice is authorized, or the network rejects the PDU session activation request if the authenticated requested slice is not authorized and the packet data session activation procedure is terminated for the requested slice.

The aforementioned first two implementations of the packet data session activation procedure correspond to a simplified solution, wherein no slice authorization or rejection information is stored during the registration of the user terminal with the network, or during the activation of a packet data session, both at the user terminal level and at the network level. Hence, this solution has the following technical effects in particular:

- a more scalable solution, because it is applicable in the same way regardless of the number of slices to which the user has subscribed (including if the maximum number increased compared to what is enabled by the standard currently);
- an economical solution in terms of storage: it is not necessary to store authorized slices/rejected slices information neither at the user terminal level nor at the network level, this allows for energy savings at the user terminal level and at the network level;
- a simpler solution: the fact of not having a storage of information on authorized slices/rejected slices limits the processing at the level of the user terminal and the network (for example on the selection of the slices during the registration request and the request to activate a packet data session);
- a simpler solution for location management: it is not necessary for the network to inform the user terminal each time a slice changes state (authorized/rejected) according to its current location since the slice authorized/rejected state is neither managed nor stored;
- a simpler solution for slice instance selection: The network slice instance (NSI, Network Slice Instance) selection is not done during the registration of the user terminal but during the activation of the packet data session and this could be done at the same time as the verification of the authorization for the requested slice (a single query to the network entity NSSF for the authorization verification and the slice instance selection);

a more economical solution in terms of processing time: the access control network entity (AMF for example) is potentially capable of managing more user terminals since it no longer manages information on authorized slices/rejected slices for these terminals and therefore no longer implements the related processing.

For the aforementioned last two implementations, some information on rejected slices are stored in addition to or as a replacement of information on authorized slices at the time of registration (while, according to the current standard, only information on authorized slices is stored) in particular at the network level, in the context parameter of the user terminal or in the subscription data management network device and are used during the packet data session activation procedure. This is described before in connection with the third variant of the registration method. As a reminder, according to this third variant of this registration method, the results of the verification of the slices required for the registration of the user terminal are stored respectively in a variable listing the identifiers of the authorized slices (for example the parameter Allowed NSSAI) and in a variable listing the identifiers of the rejected slices (for example the parameter Rejected NSSAI). Thus, according to this third variant of the registration method, the network is aware of the authorized and rejected slices, for example by storing in the context parameter of the user terminal UE1 (for example the piece of data/variable UE Context) the variables Allowed NSSAI and Rejected NSSAI or by storing them in the subscription data management network device. Hence, this information is used for the implementation of the procedure for managing a request to activate a packet data session from the user terminal to the network, according to the different variants described hereinafter.

According to a first variant of the procedure for managing a request to activate a packet data session, the verification of the requested slice first comprises a search for the identifier Sli of this requested slice in the list of authorized slices. If this search is positive, i.e. if the requested slice is authorized, then the packet data session activation procedure continues, for example by implementing the above-described step of selecting a session control network entity. It should be noted that if the slice is present in the list of authorized slices, this means that it has also been authenticated, therefore the above-described authentication step is not implemented again. However, according to this first variant, if the search is negative, i.e. if the requested slice has not been authorized beforehand, then the request to activate a packet data session is rejected for the requested slice. It should also be noted that this first variant of the procedure for managing a request to activate a packet data session may be implemented following a registration request according to the current standard, which indeed stores the list of authorized slices.

A second variant of the procedure for managing a request to activate a packet data session differs from the first variant hereinabove only in that, when the search is negative, then a second verification of the authorization for the requested slice is implemented, according to the above-described first or second implementations with steps 300, 310 and 320, i.e. by obtaining, from the subscription identifier, a piece of information allowing determining this authorization. This second variant assumes that the requested slice might simply not have been part of the registration request, in which case it could not have been authorized during the registration procedure, which does not necessarily imply that it will be rejected.

According to a third variant of the procedure for managing a request to activate a packet data session, the verification of the requested slice first comprises a search for the identifier Sli of this requested slice in the list of rejected slices. If this search is positive, i.e. if the requested slice is rejected, then the request to activate a packet data session is rejected for the requested slice.

However, if the search is negative, i.e. if the requested slice has not been rejected beforehand, then a second search for the identifier Sli of the requested slice in the list of authorized slices is implemented. If this second search is positive, i.e. if the requested slice is authorized, then the packet data session activation procedure continues, for example by implementing the previously-described session control entity selection step. If the second search is negative, then the request to activate a packet data session is rejected for the requested slice.

According to a fourth variant, if this second search is negative, i.e. the requested slice is neither in the list of authorized slices nor in the list of rejected slices, a second verification of the authorization for the requested slice is implemented, according to the above-described first or second implementations with steps 300, 310 and 320, i.e. by obtaining, from the subscription identifier, a piece of information allowing determining this authorization.

then a second verification of the authorization for the requested slice is implemented, according to the above-described first or second implementations with steps 300, 310 and 320, i.e. by obtaining, from the subscription identifier, a piece of information allowing determining this authorization.

Finally, according to a fifth variant of the procedure for managing a request to activate a packet data session, the verification of the requested slice first comprises, like the third variant, a search for the identifier Sli of this requested slice in the list of rejected slices. If this search is positive, i.e. if the requested slice is rejected, then the request to activate a packet data session is rejected for the requested slice. However, according to this fifth variant, if the search is negative, i.e. if the requested slice has not been rejected beforehand, then the packet data session activation procedure continues, for example by implementing the previously-described session control entity selection step.

Thus, these different variants allow taking advantage of the storage of some slice information (authorized and/or rejected) to ensure a better control of the use of the slices, to simplify the procedure for managing a request to activate a packet data session and in particular to pool the authorization verification it provides for at the level of the session control entity.

Finally, as mentioned hereinabove, the procedure for managing a request to activate a packet data session may be implemented according to two embodiments, the first one providing for a verification of the authorization for a slice then an authentication (if required) of the authorized slice and the second one providing for this authentication (if required) before the verification of the authorization, these two embodiments may, moreover, be implemented by one or more network entities (in particular an access management entity like AMF and a session control entity like SMF), depending on the situation.

These different situations are described in particular hereinafter, with reference to the Figures [FIG. 3*b*], [FIG. 3*c*], [FIG. 3*d*] for the first embodiment and [FIG. 3*e*], [FIG. 3*f*] and [FIG. 3*g*] for the second embodiment.

In the context of the first embodiment, FIG. 3*b* illustrates the situation where the verification of the authorization for a slice, implemented before the slice authentication, is performed by a network entity NE1, for example an access control entity AMF. Thus, this entity AMF receives during a step 300 a request to activate a packet data session from the user terminal (UE1) for a slice of the network and in particular implements an interrogation 312 of another slice instance selection network entity NE4, for example the entity NSSF, in order to obtain a piece of information allowing determining the authorization for the requested slice. Upon reception of the reply from the entity NSSF, the AMF implements a step 320 of verifying the authorization for the requested slice. Afterwards, the procedure continues, in particular with an authentication of the authorized slice if it is required.

FIG. 3*c* illustrates the situation where the verification of the authorization for a slice is performed by a network entity NE1, for example an access control entity AMF, before the slice authentication performed by another network entity NE2, for example a session control network entity SMF. To do so, the request to activate a packet data session received by the AMF, from the user terminal (UE1) for a slice of the network, is transmitted, during a step 300', to the SMF (selected beforehand) for the authentication of the slice, previously authorized by the AMF (via the previously-described steps 312 and 320).

FIG. 3*d* illustrates the situation where the verification of the authorization for a slice and afterwards the slice authentication are performed by a network entity NE2, for example a session control network entity SMF. However, to do so, the network entity NE1, for example an access control entity AMF receives during a step 300 a request to activate a packet data session from the user terminal (UE1) for a slice of the network and transmits it, during a step 300', to the SMF (selected beforehand). Afterwards, it is the entity SMF which implements an interrogation 312 of another slice instance selection network entity NE4, for example the entity NSSF, in order to obtain a piece of information allowing determining the authorization for the requested slice.

Upon reception of the reply from the entity NSSF, the entity SMF implements a step 320 of verifying the authorization for the requested slice. Afterwards, the procedure continues, in particular with an authentication of the authorized slice if it is required.

In the context of the second embodiment, FIG. 3*e* illustrates the situation where the verification of the authorization for a slice is performed after the slice authentication, by a network entity NE1, for example an access control entity AMF. Thus, this entity AMF receives during a step 300 a request to activate a packet data session from the user terminal (UE1) for a slice of the network and implements, if required, an authentication 400 of the requested slice, then an interrogation 312 of another slice instance selection network entity NE4, for example the entity NSSF, in order to obtain a piece of information allowing determining the authorization for the requested slice.

Upon reception of the reply from the entity NSSF, the AMF implements a step 320 of verifying the authorization for the requested slice. Afterwards, the procedure continues, in particular with a selection of the session control network entity NE2 (for example SMF).

FIG. 3*f* illustrates the situation where the verification of the authorization for a slice is performed by a network entity NE2, for example a session control network entity SMF, after the slice authentication performed by a network entity NE1, for example an access control entity AMF.

Thus, this entity AMF receives during a step 300 a request to activate a packet data session from the user terminal (UE1) for a slice of the network and implements, if required, an authentication 400 of the requested slice, then the AMF transmits, during a step 300', the request to activate a packet data session to the SMF (selected beforehand). Afterwards, it is the entity SMF which implements an interrogation 312 of another slice instance selection network entity NE4, for example the entity NSSF, in order to obtain a piece of information allowing determining the authorization for the requested slice. Upon reception of the reply from the entity NSSF, the entity SMF implements a step 320 of verifying the authorization for the requested slice. Afterwards, the procedure continues, in particular with the reply of the entity SMF to the request 300' transmitted by the AMF (i.e. acceptance or not of the activation request).

Finally, FIG. 3*g* illustrates the situation where the verification of the authorization for a slice is performed by a network entity NE2, for example a session control network entity SMF, after the slice authentication performed by the same entity SMF. To do so, the request to activate a packet data session from the user terminal (UE1) for a slice of the network, received by the network entity NE1, for example the access control entity AMF, is transmitted during a step 300', to the SMF (selected beforehand). Afterwards, it is the entity SMF which implements, if required, an authentication 400 of the requested slice, then an interrogation 312 of another slice instance selection network entity NE4, for example the entity NSSF, in order to obtain a piece of information to determine the authorization for the requested slice. Upon reception of the reply from the entity NSSF, the entity SMF implements a step 320 of verifying the authorization for the requested slice. Afterwards, the procedure continues, in particular with the reply of the entity SMF to the request 300' transmitted by the AMF (i.e. acceptance or not of the activation request).

It should be understood that in all of the embodiments and variants of the procedure for managing a request to activate a packet data session according to the invention, the activation request sent by a terminal triggers in a network equipment the verification of the authorization of the corresponding slice, in contrast with the prior technique where only a recording request triggers such a verification.

The invention claimed is:

1. A method comprising:

managing an activation request to activate a packet data session for a user terminal capable of transmitting and receiving data over a communications network organized into network slices, the user terminal comprising a subscription identifier for at least one of the slices of the network, the managing being implemented by at least one network device, and comprising:

receiving the activation request to activate the packet data session from the user terminal for a requested slice of the network, the activation request comprising an identifier of the requested slice, obtained from a parameter comprising at least one identifier of at least one user-subscribed slice, the activation request being independent of an authorization or a rejection of the requested slice determined during a procedure of registration of the user terminal with the network;

obtaining, from the subscription identifier, at least one piece of information allowing determining an authorization for the requested slice; and verifying the authorization for the requested slice taking into account the at least one piece of information allowing determining the authorization for the obtained requested slice and, in response to the verification being negative, rejecting the request to activate the packet data session for the requested slice, wherein verifying the authorization for the requested slice is triggered by the activation request.

2. The method according to claim 1, where verifying the authorization for the requested slice takes also account of at least one piece of data relating to a current location of the user terminal and/or a type of access used by the user terminal.

3. The method according to claim 1, comprising, in response to the verification being positive and a subscription piece of data comprising an indicator requiring the authentication of the authorized slice, authenticating the authorized slice, and if the authenticating is positive, carrying on the procedure for managing the request to activate the packet data session for the authorized slice; or if the authentication is negative, rejecting the request to activate the packet data session for the authorized slice.

4. The method according to claim 1, comprising, before verifying the authorization for the slice and in response to a subscription piece of data comprising an indicator requiring the authentication of the slice, authenticating the requested slice, and in response to the authentication being negative, rejecting the request to activate the packet data session for the requested slice.

5. The method according to claim 1, where the obtaining comprises transmitting a query request intended for a subscription data management network device, the request comprising the subscription identifier, and receiving a reply from the subscription data management network device comprising the at least one piece of information allowing determining the authorization for the requested slice.

6. The method according to claim 1, where verifying the authorization for the slice comprises transmitting a query request intended for a slice instance selection network device, the request comprising the at least the identifier of the requested slice and a subscription piece of data comprising the identifiers of the subscribed slices, and receiving a reply from the slice instance selection network device comprising a piece of information representative of an authorization or a rejection for the requested slice.

7. The method according to claim 1, where the authorization for the slice is followed by selecting a session control network device and controlling, by the selected session control network device, the validity of the request to activate the packet data session for the user terminal and the authorized slice, taking into account the at least one subscription piece of data and a policy of the selected session control network device.

8. A device implemented by at least one network device, and comprising:

a receiver;

a transmitter;

at least one processor; and at least one memory coupled to the at least one processor and comprising instructions stored therein which when executed by the at least one processor configure the device to manage a request to activate a packet data session for a user terminal capable of transmitting and receiving data over a communications network organized into network slices, the user terminal comprising a subscription identifier for at least one of the slices of the network, wherein the managing comprises:

receiving the activation request to activate the packet data session from the user terminal for a slice of the network, the activation request comprising an identifier of the requested slice, obtained from a parameter comprising at least one identifier of at least one user-subscribed slice, the activation request being independent of an authorization or a rejection of the requested slice determined during a procedure of registration of the user terminal with the network;

obtaining, from the subscription identifier, at least one piece of information allowing determining an authorization for the requested slice; and verifying the authorization for the requested slice taking into account the at least one piece of information allowing determining the authorization for the obtained requested slice and, in response to the verification being negative, rejecting the request to activate the packet data session for the requested slice, wherein verifying the authorization for the requested slice is triggered by the activation request.

9. At least one non-transitory computer readable information medium including instructions of a computer program stored thereon which when executed by at least one processor of at least one network device, implement a method of managing an activation request to activate a packet data session for a user terminal capable of transmitting and receiving data over a communications network organized into network slices, the user terminal comprising a subscription identifier for at least one of the slices of the network, wherein the method comprises:

receiving the activation request to activate the packet data session from the user terminal for a requested slice of the network, the activation request comprising an identifier of the requested slice, obtained from a parameter comprising at least one identifier of at least one user-subscribed slice, the activation request being independent of an authorization or a rejection of the requested slice determined during a procedure of registration of the user terminal with the network;

obtaining, from the subscription identifier, at least one piece of information allowing determining an authorization for the requested slice; and verifying the authorization for the requested slice taking into account the at least one piece of information allowing determining the authorization for the obtained requested slice and, in response to the verification being negative, rejecting the request to activate the packet data session for the requested slice, wherein verifying the authorization for the requested slice is triggered by the activation request.

* * * * *